July 23, 1946.  J. M. HAIT  2,404,487
AMPHIBIAN PROPULSION MECHANISM
Filed Jan. 8, 1942
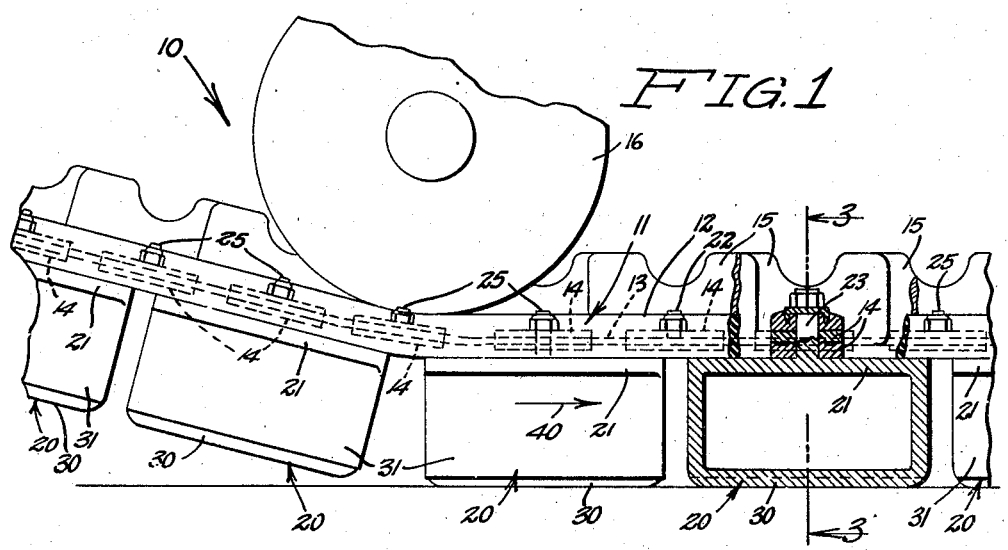
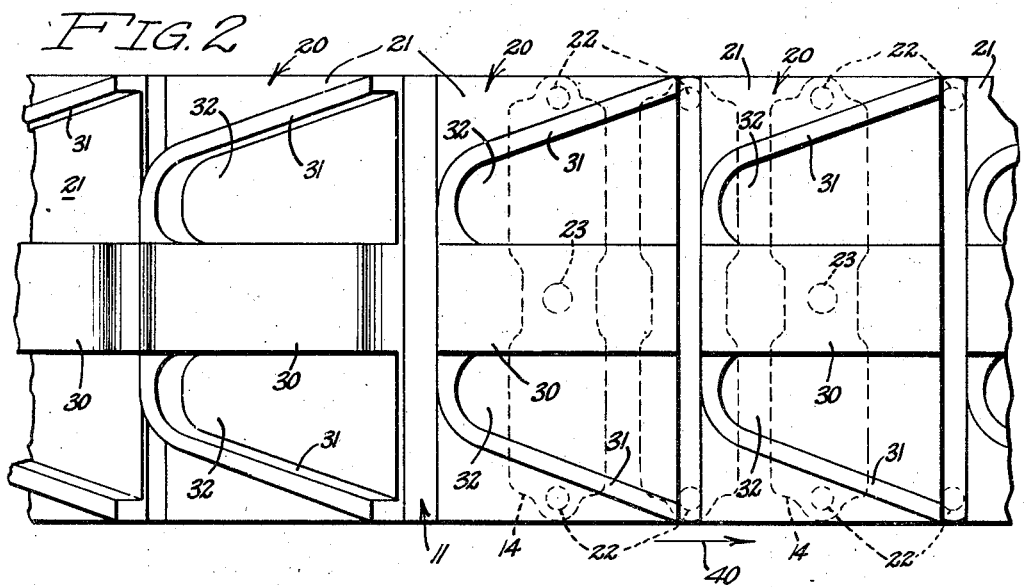
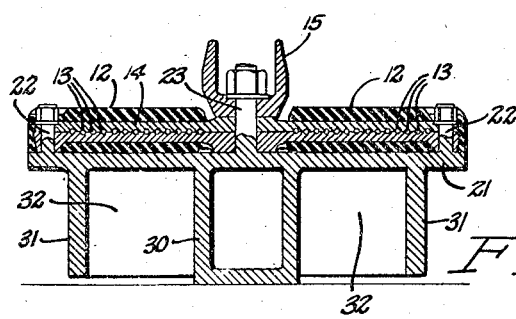
INVENTOR:
JAMES M. HAIT
ATTORNEY Patented July 23, 1946

2,404,487

UNITED STATES PATENT OFFICE 2,404,487

AMPHIBIAN PROPULSION MECHANISM

James M. Hait, San Gabriel, Calif., assignor to Food Machinery Corporation, San Jose, Calif., a corporation of Delaware Application January 8, 1942, Serial No. 426,028

4 Claims. (Cl. 115—1)

This invention relates to amphibian tanks and particularly to mechanisms for propelling the same when these travel either on the land or through water.

In order for an amphibian to secure propulsion through the water the traction belts thereof must be provided with impeller blades or grousers to engage the water and produce a thrust. These blades however, when extending downwardly from the traction belts, are subject to such strains as to seriously limit the speed at which the tank may be driven without breaking or injuring the blades particularly when the tank is driven over hard-surfaced terrain such as paved roads.

It is the principal object of the invention to provide an endless track type propulsion mechanism for an amphibian tank which will minimize or eliminate the above difficulty.

Further objects and advantages will be made manifest in the following description of the invention taken in connection with the accompanying drawing, in which:

Fig. 1 is a fragmentary side elevational view of a preferred embodiment of the invention with a portion of one of the grousers of the invention broken away to illustrate the construction thereof.

Fig. 2 is a bottom plan view of Fig. 1.

Fig. 3 is a cross-sectional view taken on the line 3—3 of Fig. 1.

Referring specifically to the drawing, this is seen to illustrate an amphibian propulsion mechanism 10 which is adapted to be mounted on an amphibian tank. Tanks customarily are provided with a pair of endless traction belts or chains, generically referred to hereinafter as "belts." The manner of mounting and driving these belts being well known in the art, it has been deemed unnecessary to illustrate in the drawing the devices employed for this purpose.

The mechanism 10 includes an endless traction belt 11 which is preferably formed of two bands of rubber 12 which are reinforced longitudinally by endless cables 13 which are gripped by an endless series of metal clamps 14, said cables and clamps both being imbedded in said rubber bands 12. In between said bands, the clamps 14 are provided with wheel guides 15 by which the belt is guided over bogie wheels 16.

The mechanism 10 also includes an endless series of grousers 20, each of which comprises a base plate 21 having studs 22 and 23 which extend upwardly through the clamps 14, bind these together and also secure the guides 15 to these clamps. The grousers 20 may be applied to each of the clamps 14 or to every other clamp, as shown in the drawing. When the grousers are only attached to alternate clamps 14, the other clamps are assembled by suitable studs 25 similar to the studs 22 and 23 but which are rooted in the lower plate of each of the clamps 14 instead of in the grouser base plates 21.

Provided on each grouser is a hollow block 30 which is preferably disposed centrally of the grouser although it may be provided along one side or the other thereof, or along both sides. Disposed alongside the block 30 on each grouser 20 and preferably of slightly less depth than the block 30 are impeller blades 31 which cooperate with the block 30 to form cups 32 which catch water when the amphibian is traveling in water by virtue of the belt 11 traveling in the direction of the arrow 40 in Figs. 1 and 2.

It will readily be seen that the amphibian propulsion mechanism 10 of my invention is well adapted to perform the two principal offices of such a mechanism, that is, to provide adequate thrust for propelling the craft through the water when it is afloat and yet when the craft undertakes to travel on land to adequately support the weight thereof and thereby relieve the main burden of providing this support from the propelling blades.

What I claim is:

1. In an amphibian propulsion mechanism, the combination of: an endless traction-propulsion belt; means for mounting said belt on an amphibian and driving said belt; a series of grousers secured to said belt, said grousers having water engaging blades disposed below said belt, and blocks extending downward from said belt to form a relatively continuous support for said belt, and protect said blades from being crushed by the weight of said amphibian.

2. A combination as in claim 1 in which said blocks extend below the lower ends of said blades thus normally relieving said blades of the function of supporting said amphibian.

3. In an amphibian propulsion mechanism, the combination of: an endless traction-propulsion belt; means for mounting said belt on an amphibian and driving it; a series of grousers secured to said belt, each of said grousers having a block extending downwardly centrally therefrom so that said blocks provide a substantially continuous support for the belt when said amphibian is traveling on land, said grousers also having water propelling blades extending laterally from said blocks and forming water-receiving pockets on opposite sides of said block, the outer walls of which are inclined outwardly and in the direction of movement of said grousers.

4. In an amphibian propulsion mechanism, the combination of: an endless traction-propulsion belt; means for mounting said belt on an amphibian and driving it; a series of grousers secured to said belt, each of said grousers having a block so that the blocks of all of said grousers unite to form a relatively continuous support for said belt when said amphibian is traveling on land, said grousers also having water-engaging blades disposed below said wheel means alongside said blocks and uniting therewith to form water-trapping pockets.

JAMES M. HAIT.